United States Patent
Paroni et al.

(10) Patent No.: US 10,241,254 B2
(45) Date of Patent: Mar. 26, 2019

(54) VEHICLE LIGHT COMPRISING A PORTION OF LIGHT EMISSION WITH OPALESCENT EFFECT

(71) Applicant: AUTOMOTIVE LIGHTING ITALIA S.p.A., Turin (IT)

(72) Inventors: Sara Paroni, Turin (IT); Marco Svettini, Turin (IT); Fabio Lupieri, Turin (IT)

(73) Assignee: AUTOMOTIVE LIGHTING ITALIA S.p.A., Turin (IT)

(*) Notice: Subject to any disclaimer, the term of this patent is extended or adjusted under 35 U.S.C. 154(b) by 0 days.

(21) Appl. No.: 15/635,297

(22) Filed: Jun. 28, 2017

(65) Prior Publication Data
US 2018/0003882 A1 Jan. 4, 2018

(30) Foreign Application Priority Data
Jun. 30, 2016 (IT) .................. 102016000068214

(51) Int. Cl.
*F21V 8/00* (2006.01)
*F21S 43/241* (2018.01)
(Continued)

(52) U.S. Cl.
CPC .............. *G02B 6/0036* (2013.01); *B60Q 3/62* (2017.02); *F21S 41/147* (2018.01); *F21S 41/24* (2018.01);
(Continued)

(58) Field of Classification Search
CPC . B60Q 3/62; F21S 41/147; F21S 41/24; F21S 43/14; F21S 43/239; F21S 43/241;
(Continued)

(56) References Cited

U.S. PATENT DOCUMENTS 1,896,887 A * 2/1933 Falge .................. B60Q 1/2607
362/240
4,991,073 A * 2/1991 Levin ...................... F21V 5/048
362/309
(Continued)

FOREIGN PATENT DOCUMENTS

EP 1895228 A1 3/2008
EP 2317214 A1 5/2011
(Continued)

OTHER PUBLICATIONS

Italian Search Report dated Apr. 24, 2017 for Italian Patent Application No. UA20164809 (10 pages).

*Primary Examiner* — Claude J Brown
(74) *Attorney, Agent, or Firm* — Howard & Howard Attorneys PLLC (57) ABSTRACT

Vehicle light comprising a container body that houses at least one light source, a lenticular body, a light guide, the light source, so as to receive the light beam and transmit it to a light outlet wall. The light guide comprises a body that defines the propagation direction of the light beam inside the body by total internal reflection. The body has a first groove, comprising a plurality of first holes, defining cylindrical or spherical optics that produce a scattering of said light rays (Ri) towards the light outlet wall so as to emit a light beam with opalescent effect. The first holes are adjacent to each other without interruption and are blind with respect to a thickness of the body of the light guide, penetrating from a first face of the body for a first depth less than said thickness.

20 Claims, 8 Drawing Sheets (51) Int. Cl.
*B60Q 3/62* (2017.01)
*F21S 41/147* (2018.01)
*F21S 41/24* (2018.01)
*F21S 43/14* (2018.01)
*F21S 43/239* (2018.01)
*F21S 43/243* (2018.01)
*G02B 6/00* (2006.01)

(52) U.S. Cl.
CPC ............. *F21S 43/14* (2018.01); *F21S 43/239* (2018.01); *F21S 43/241* (2018.01); *F21S 43/243* (2018.01); *G02B 6/00* (2013.01); *G02B 6/0045* (2013.01)

(58) Field of Classification Search
CPC .... F21S 43/243; F21S 48/1241; F21S 48/225; G02B 6/0036; G02B 6/0045; D06F 33/00
USPC .......................................... 362/511; 235/375
See application file for complete search history.

(56) References Cited

U.S. PATENT DOCUMENTS

| | | | | |
|---|---|---|---|---|
| 6,352,359 B1* | 3/2002 | Shie | .................. | F21V 5/002 |
| | | | | 362/522 |
| 2005/0180165 A1* | 8/2005 | Sado | .................. | G02B 6/002 |
| | | | | 362/606 |
| 2008/0273351 A1* | 11/2008 | Ajiki | .................. | F21S 8/00 |
| | | | | 362/617 |
| 2009/0257245 A1* | 10/2009 | Kim | .................. | G02B 6/0061 |
| | | | | 362/626 |
| 2012/0039084 A1* | 2/2012 | Eckhardt | .................. | G02B 5/124 |
| | | | | 362/516 |
| 2012/0069595 A1* | 3/2012 | Catalano | .................. | F21K 9/52 |
| | | | | 362/555 |
| 2012/0268940 A1* | 10/2012 | Sahlin | .................. | G02B 5/045 |
| | | | | 362/290 |
| 2015/0043241 A1* | 2/2015 | Deshazer | .................. | G02B 1/045 |
| | | | | 362/558 |
| 2015/0185400 A1* | 7/2015 | Lee | .................. | G02B 6/0038 |
| | | | | 362/613 |
| 2015/0346422 A1* | 12/2015 | Jang | .................. | F21S 43/26 |
| | | | | 362/511 |
| 2016/0040850 A1* | 2/2016 | Orisich | .................. | F21S 48/225 |
| | | | | 362/511 |

FOREIGN PATENT DOCUMENTS

| | | |
|---|---|---|
| EP | 2816276 A2 | 12/2014 |
| EP | 2927571 A1 | 10/2015 |
| EP | 2816276 A3 | 11/2015 |
| EP | 3150905 A1 | 4/2017 |
| FR | 2934353 A1 | 1/2010 |
| JP | 2016004607 A | 1/2016 |
| KR | 20150071410 A | 6/2015 |
| WO | 2016022251 A1 | 2/2016 |

* cited by examiner

VEHICLE LIGHT COMPRISING A PORTION OF LIGHT EMISSION WITH OPALESCENT EFFECT

CROSS-REFERENCE TO RELATED APPLICATIONS

The present application claims priority to and all the benefits of Italian Patent Application No. 102016000068214, filed on Jun. 30, 2016, which is hereby expressly incorporated herein by reference in its entirety.

BACKGROUND OF THE INVENTION

1. Field of the Invention

The present invention concerns a vehicle light comprising a portion of light emission with opalescent effect.

2. Description of the Related Art

The term 'vehicle light' is intended indifferently to mean a rear vehicle light or a front vehicle light, the latter also being called a headlamp or headlight.

As is known, a vehicle light is a lighting and/or signaling device of a vehicle comprising at least one light external to the vehicle having a lighting and/or signaling function toward the outside of a vehicle such as, for example, a position light, a direction indicator light, a brake light, a rear fog light, a reversing light, a low beam headlight, a high beam headlight, and the like.

The vehicle light, in its simplest abstraction, includes a container body, a lenticular body, and at least one light source.

The lenticular body is positioned to close the mouth of a container body so as to form a housing chamber. The light source is arranged inside the housing chamber, which may be turned so as to emit light toward the lenticular body when powered by electricity.

The construction of a vehicle light, after assembling the various components, involves fixing and hermetically sealing the lenticular body on the container body.

SUMMARY OF THE INVENTION

It is increasingly felt in the art the need to use the vehicle light not only as an instrument to satisfy the requirements of homologation, in order to obtain luminous beams that meet particular photometric requirements, but also as an instrument of design specific to the vehicle on which the light is employed.

Therefore, the light pattern emitted by the light does not only have the function of fulfilling the signaling and/or lighting function but also that of creating a precise desired lighting effect. This lighting effect or pattern more and more represents the leitmotif of some automobile manufacturers who, also with the optical component of the lights, intend to set themselves apart from their competitors.

In addition, there is a need to obtain light patterns that have specific lighting effects, such as, typically, the opalescent effect.

Such lighting effects should not, however, compromise the homogeneity of the light beam produced which, although not related to specific photometric requirements, is considered essential by end users. In other words, a non-homogenous light beam, although meeting the photometric requirements for a light, would be considered an unacceptable "defect" by the end user of the vehicle light.

There is therefore a need to obtain lights emitting a light beam with an opalescent effect without neglecting the proper homogeneity of the beam itself.

There are various methods in the art for obtaining the opaline effect on vehicle lights. The most popular use opalescent materials which, when struck by the light beam, are able to generate the lighting effect of opalescence.

The opaline material is made of a polymeric material that incorporates microspheres made of a different material so as to disperse light randomly.

By virtue of this random diffusion of the beam, it is possible to obtain the opaline effect.

There are, however, some regulations, such as those in the US, prohibiting the use of such materials in the automotive light industry.

Obtaining an opalescent effect without the use of opalescent material is not a simple matter for an engineer in the industry.

In fact, for example, the use of an embossment or a micro-optic made directly on the light output surface of a light guide plate would only partially achieve the desired aesthetic effect. More specifically, opalescence is an aesthetic feature defined by ambient light. However, an optical system employing an opaline material does not necessarily guarantee homogeneity at the same time.

It is thus perceived in the art the need to provide a vehicle light which produces a light beam that is both homogenous and opalescent at the same time without any use of opaline material.

Such requirement is satisfied by a vehicle light comprising a container body that delimits a containment seat that houses at least one light source suitable to emit, when electrically powered, a plurality of light rays defining a light beam to propagate outside of the vehicle light. The vehicle light includes a lenticular body, that partially closes the containment seat and is suitable to be crossed by said light beam produced by the light source. A light guide faces, in correspondence of a light inlet wall, to the light source, so as to receive the light beam from the light source and transmit it to a light outlet wall, facing the lenticular body. The light guide includes a body having a prevailing longitudinal extension that defines the propagation direction of the light beam inside the body by total internal reflection and, a first and a second side wall substantially parallel to the prevailing longitudinal extension. The body has a first groove, which extends from the first to the second side wall. The first groove includes a plurality of first holes, defining cylindrical or spherical optics suitable to realize cylindrical or spherical caustics that produce, through successive refractions, a scattering of light rays towards the light outlet wall so as to emit a light beam with opalescent effect. The first holes are adjacent to each other without interruption, and the first holes of the first groove are blind with respect to a thickness of the body of the light guide, penetrating from a first face of the body for a first depth less than said thickness.

Other objects, features and advantages of the present invention will be readily appreciated as the same becomes better understood after reading the subsequent description taken in connection with the accompanying drawings.

The elements or parts of elements in common between the embodiments described hereinafter will be indicated by the same numerical references.

DETAILED DESCRIPTION OF THE INVENTION

With reference to the aforementioned figures, at 4 is collectively indicated a vehicle light to which the following discussion will refer without thereby losing generality.

As mentioned above, the term vehicle light is intended indifferently to mean a rear vehicle light or a front vehicle light, the latter being also called a headlamp, or headlight.

As is known, the vehicle light comprises at least one light outside of the vehicle having a lighting and/or signaling function, as for example a position light, which may be a front, back, side position light, a direction indicator light, a brake light, a rear fog light, a reversing light, a low beam headlight, a high beam headlight, and the like.

The vehicle light 4 comprises a container body 8, usually in polymeric material, which typically allows the vehicle light 4 to be attached to the related vehicle.

For the purposes of the present invention, the container body 8 may have any shape, size and position: for example, the container body 8 may be not directly associated with the bodywork or other attachments of the associable vehicle.

According to one embodiment, the container body 8 delimits a containment seat 12 that houses at least one light source 16 suitable to emit, when electrically powered, a plurality of light rays Ri defining a light beam to be propagated outside of the vehicle light 4. For the purposes of the present invention, the type of light source used is irrelevant; preferably, the light source 16 is a light emitting diode (LED) light source.

The housing body 8 may accommodate, in said containment seat 12, intermediate support elements 18 of the various optical and/or electronic components of the vehicle light 4, in a known manner.

For example, the light sources 16 are electrically supported and powered by suitable bases 19, known in the art.

The vehicle light 4 also comprises a lenticular body 20, at least partially contiguous to the container body 8.

The lenticular body 20 is attached to the container body 8 so as to close at least partially said containment seat 12 which houses the at least one primary light source 16.

For the purposes of the present invention, the lenticular body 20 may be external so as to define at least one outer wall of the vehicle light directly subject to the atmosphere.

It is also possible to provide that the lenticular body 20 is inside a vehicle so as to be housed inside a vehicle's interior; this is the case, for example, of a dome light or a light that is part of a dashboard of a vehicle.

The lenticular body 20 closes the containment seat 12 and is suitable to be crossed by the light beam produced by the primary light source 16.

In this regard, the lenticular body 20 is made of at least partially transparent or semitransparent or translucent material, which may also include one or more opaque portions, so as to allow, however, the crossing, at least partial, of a primary light beam emitted by said at least one primary light source 16.

According to possible embodiments, the material of the lenticular body 20 is a resin such as PMMA, PC and the like.

The vehicle light 4 further comprises a light guide 24 facing, at its light inlet wall 28, the at least one light source 16, so as to receive the light beam from the same and transmit it to a light outlet wall 32, facing the lenticular body 20.

The light guide 24 comprises a body 36 having a prevailing longitudinal extension L that defines the direction of propagation of the light beam inside the body 36 by total internal reflection, as well as having a first and a second side wall 40,44 substantially parallel to said prevailing longitudinal extension L.

Advantageously, the body 36 has a first groove 48, which extends from the first to the second side wall 40, 44, the first groove 48 comprising a plurality of first holes 52, defining cylindrical or spherical optics suitable to produce cylindrical or spherical caustics that produce, through successive refractions, a scattering of said light rays Ri towards the light outlet wall 32 so as to emit a light beam with opalescent effect.

The first holes or optics 52 are side by side without interruption, so as to interpenetrate each other at least partially. In other words, the two first adjacent holes 52 are not completely separated by a portion of the body 36 but share at least partially portions of the respective side walls.

The first holes 52 of the first groove 48 are blind, i.e. non-through, relative to a thickness 56 of the body 36 of the light guide 24, penetrating from a first face 60 of the body 36 for a first depth 64 less than said thickness 56. For example, said first holes 52 have a diameter ranging from 1 mm to 5 mm.

Figure 8:
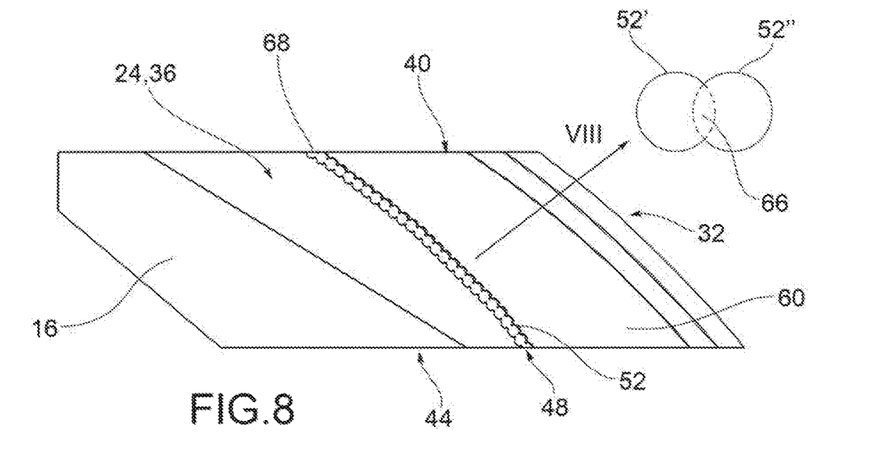
FIG. 8 is another view, from different angles, of other details of a vehicle light according to the present invention.

As mentioned, the first holes 52 are substantially tangential or at most at least partially interpenetrating each other, e.g. for a circular sector 66 equal to 1-10% of their total area, measured with respect to a section plane perpendicular to a first hole axis X-X (see enlarged detail VIII in FIG. 8, relating to the two first adjacent holes 52', 52"). For the purposes of the operation of the present invention, it is important that there is no free path from said first holes 52 for the light beams R1. In other words, all the radii must pass through said first holes 52 to be optically influenced by the same. It should be noted that the tangency or the interpenetration of the holes may depend on the production process: laser drilling results in substantially tangential holes, whereas an injection molding process tends to assume an interpenetration of the same holes.

According to one embodiment, said first holes 52 are circular section holes, equidistant from each other and having the same diameter.

The first holes 52 may provide a slight flaring or draft angle to facilitate the extraction of the body 36 of the light guide 24 from the mold.

The first groove 48, with respect to a section plane perpendicular to the first axes X-X of the first holes 52, extends along a first curvilinear segment 68 substantially parallel to the light outlet wall 32.

The first curvilinear section 68 may also be straight.

The body 36, on the light outlet wall 32 has a diffusive portion 72, comprising micro-optics and/or an embossment and/or a satin finish, suitable to standardize and to spread the light beam that is emitted by the light outlet wall 32.

In other words, the diffuser portion 72 serves to blur the light until the contour of the holes 52, 92 is removed so as to block the only contribution provided by the aforementioned cylindrical or spherical optics.

The diffusive portion 72, comprising micro-optics and/or an embossment and/or satin finish, suitable to standardize and to spread the light beam that is emitted by the light outlet wall 32, may also be made on the lenticular body 20.

For example, the diffusive portion 72 extends to a segment 76 of the light outlet wall at the extension of said first depth 64 of the first groove 48. In this manner, the light rays from the first groove are further homogenized in outlet by the light outlet wall 32.

Figure 1:
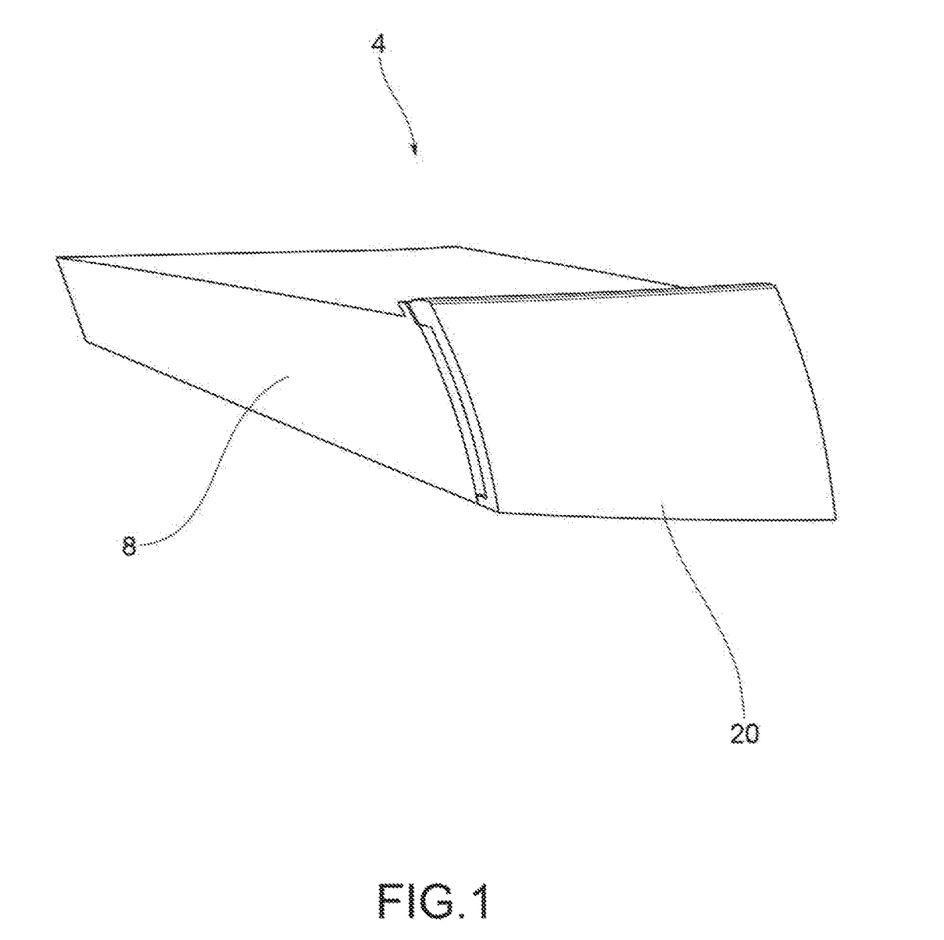
FIG. 1 is a perspective view of the front of a vehicle light according to the present invention in an assembly configuration.
Figure 2:
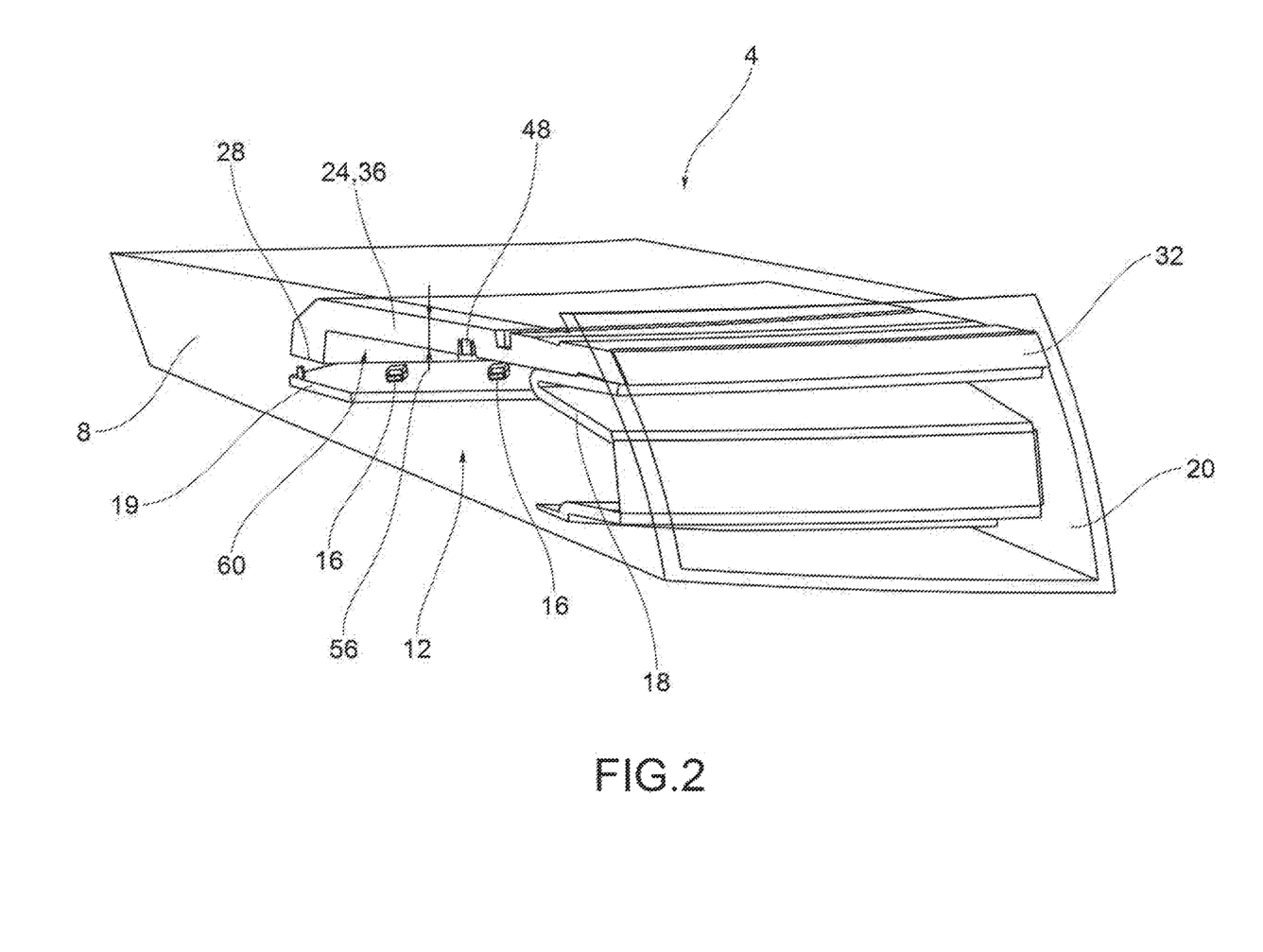
FIG. 2 is a transparent perspective view of the vehicle light of FIG. 1.
Figure 3A:
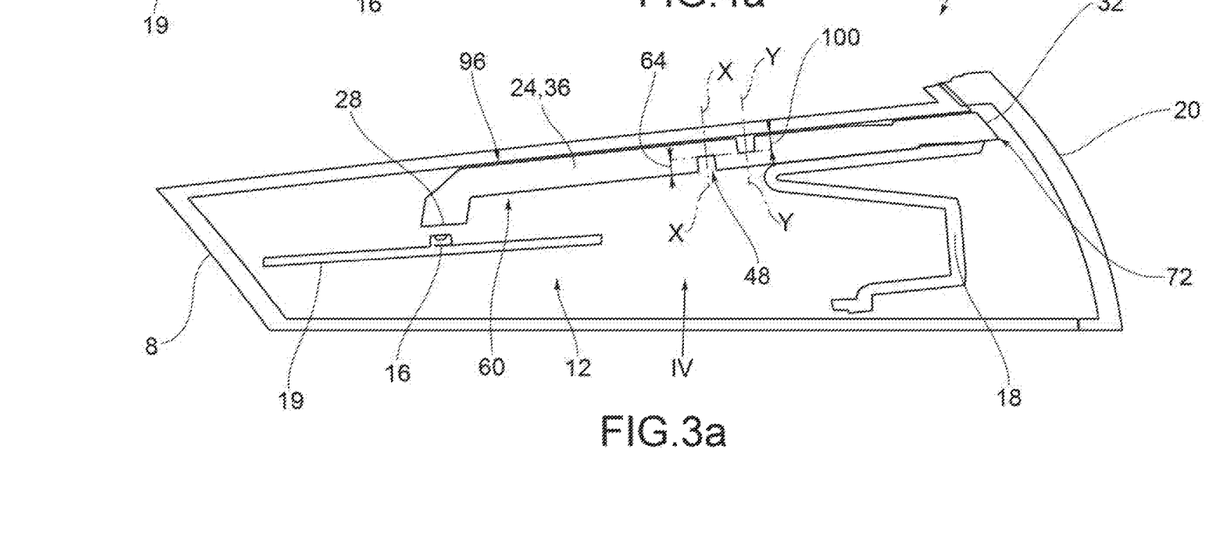
FIG. 3a is a sectional view of the vehicle light of FIG. 1.
Figure 3B:
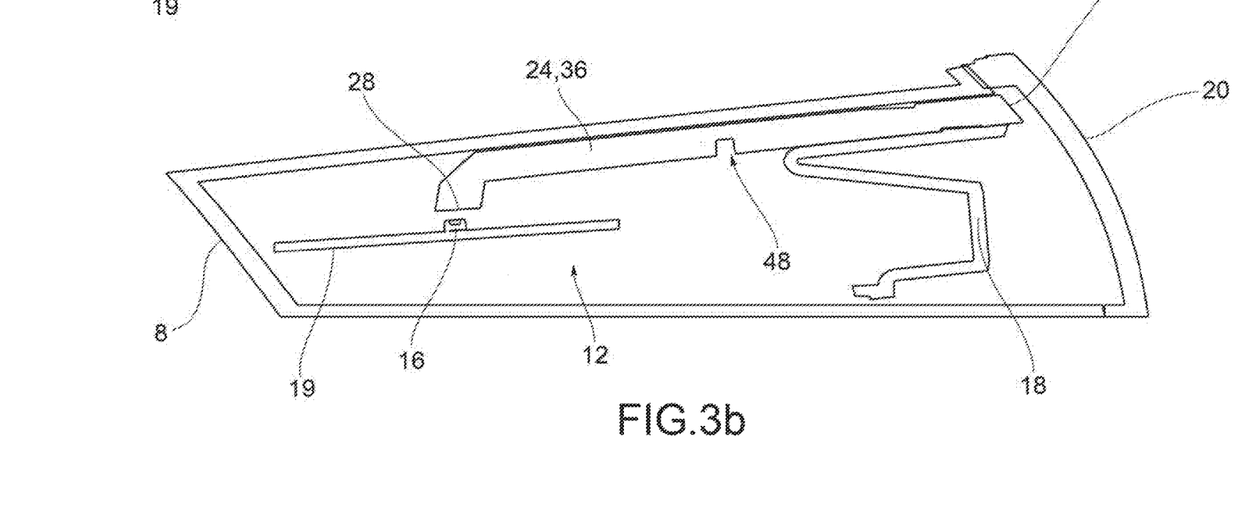
FIG. 3b illustrates the vehicle light of FIG. 3a according to a further embodiment of the present invention.
Figure 4A:
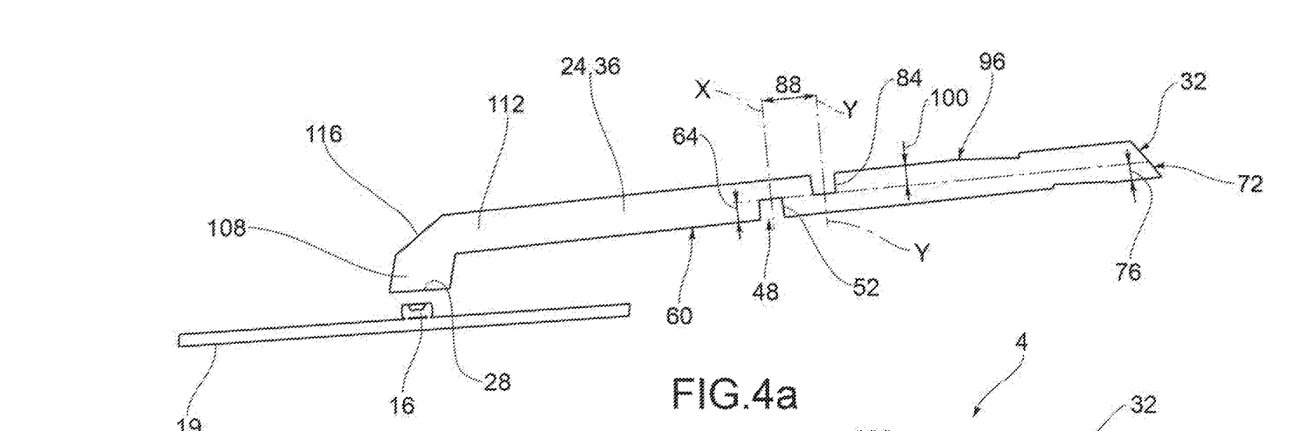
FIG. 4a shows a detail IV of FIG. 3.
Figure 4B:
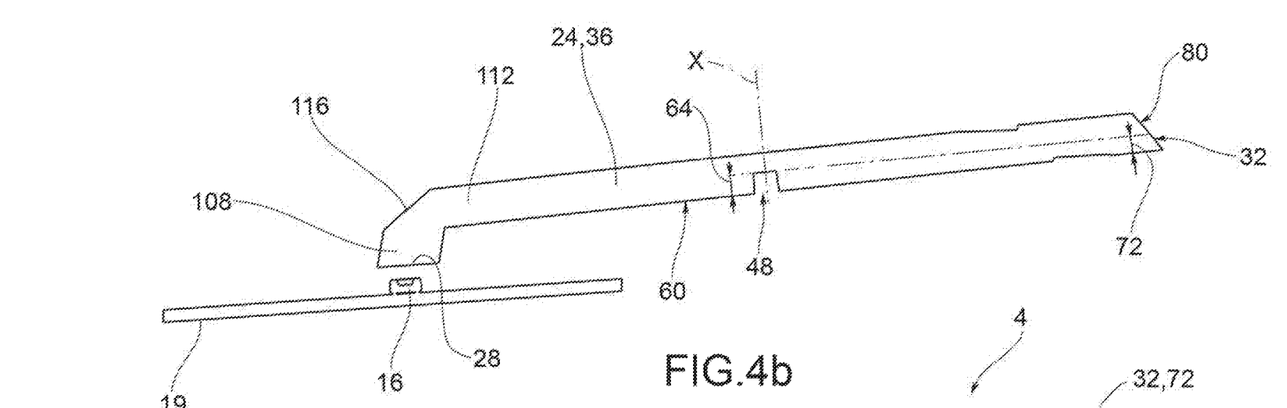
FIG. 4b illustrates the detail IV of FIG. 4a according to a further embodiment of the present invention.
Figure 5:
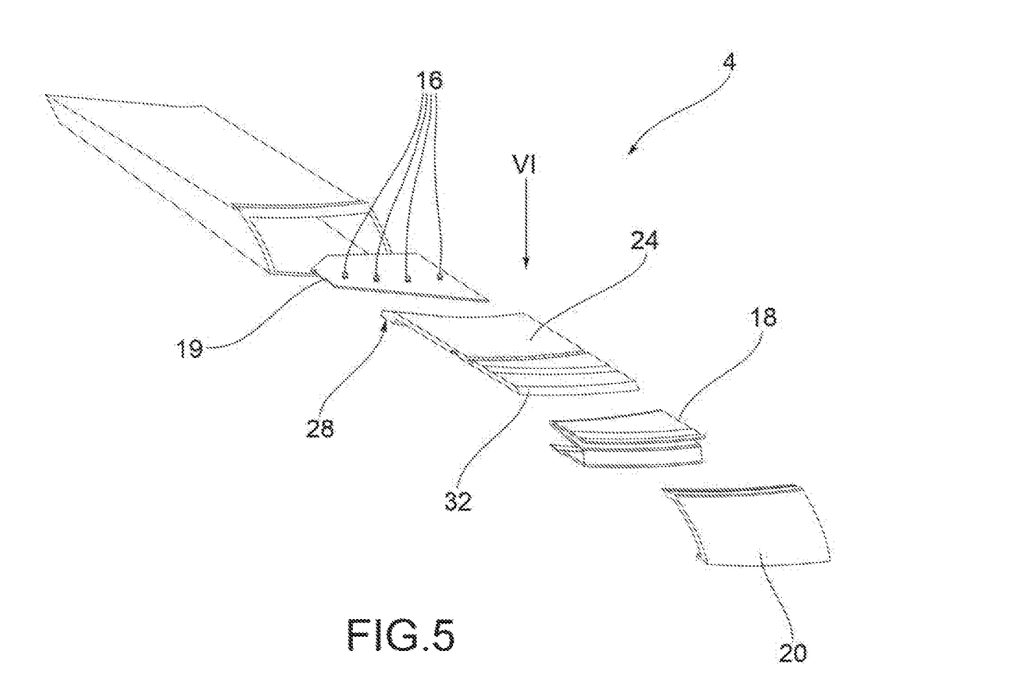
FIG. 5 is a perspective view, in separate parts, of a vehicle light according to the present invention.
Figure 6:
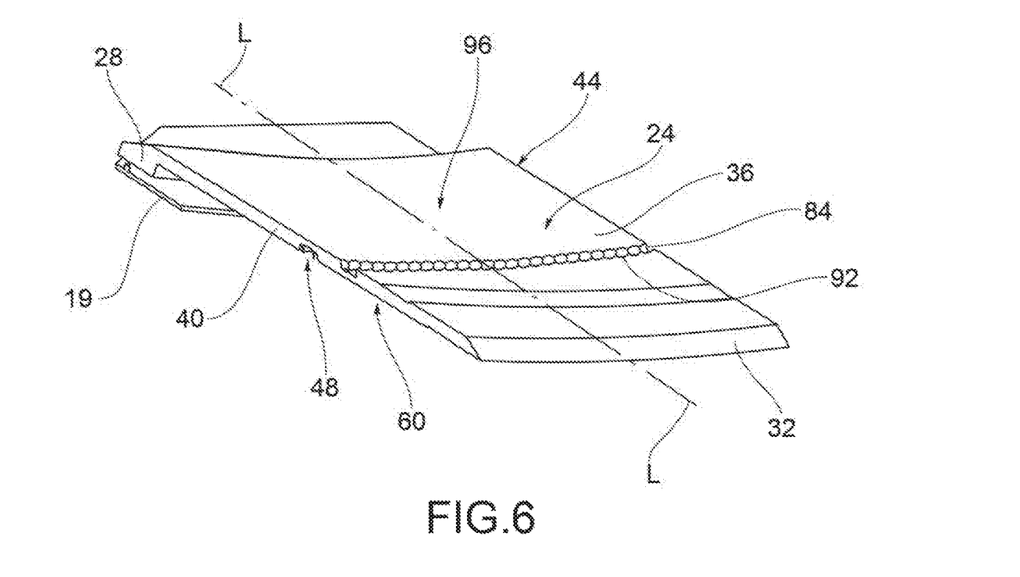
FIG. 6 is a perspective view of detail VI of FIG. 6.
Figure 7:
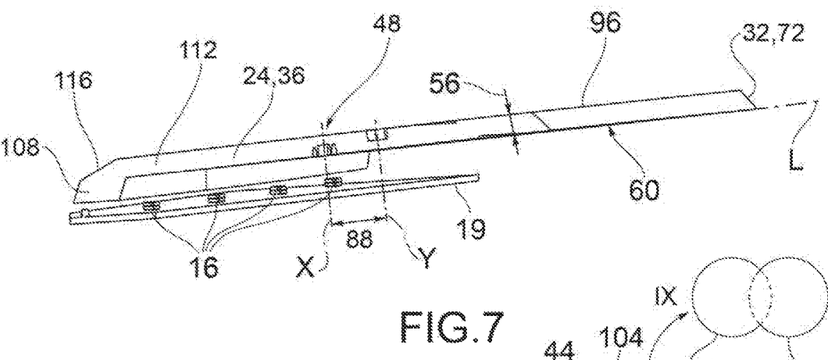
FIG. 7 is a view of details of a vehicle light according to the present invention.

The body 36 on the light outlet wall 32 may have a mask 80 arranged on the body portion not affected by said first holes 52. The mask 80 is configured so as not to be crossed by the light beams incident on the same (FIG. 4*b*).

According to one embodiment, the body 36 has a second groove 84 extending from the first to the second side wall 40, 44, in an offset position relative to the first groove 48 along the direction of propagation of the light beam by a step 88.

The second groove 84 comprises a plurality of second holes 92, defining cylindrical or spherical optics suitable to produce cylindrical or spherical caustics that produce, through successive refractions, a scattering of said light rays Ri towards the light outlet wall 32.

The second holes 92 are side by side without interruption, so as to at least partially interpenetrate each other.

The second holes 92 of the second groove 84 are blind, i.e. non-through, with respect to a thickness 56 of the body 36 of the light guide 24, penetrating from a second face 96 of the body 36 opposite to the first face 60 along the thickness 56 of the body 36 for a second depth 100 less than said thickness 56.

For example, said second holes 92 have a diameter ranging from 1 mm to 5 mm.

Figure 9:
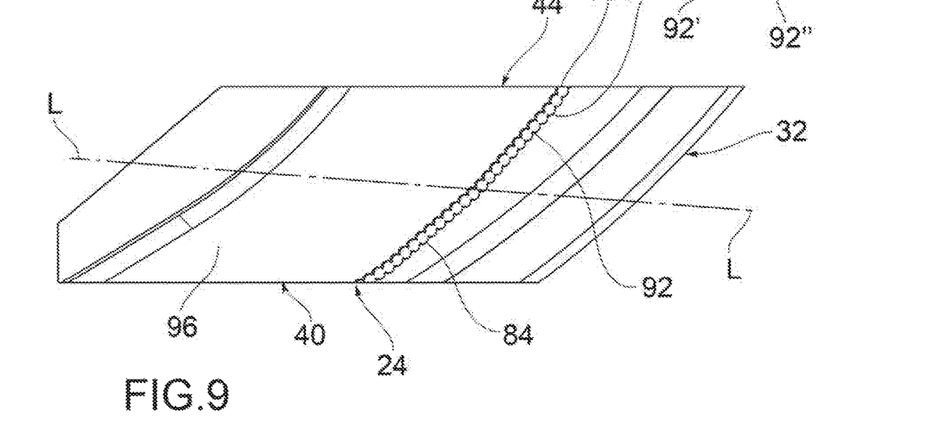
FIG. 9 is another view of other details of a vehicle light according to the present invention.
Figure 10:
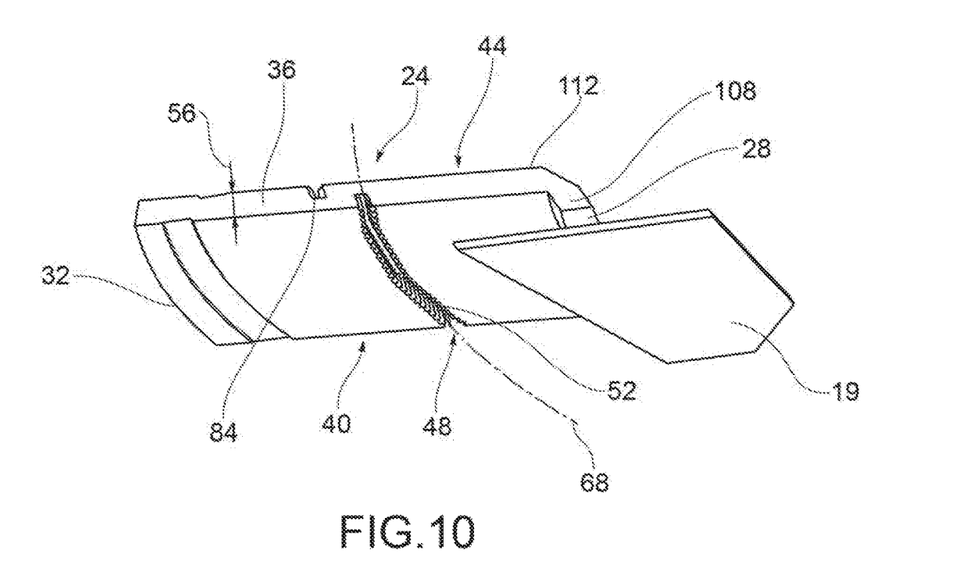
FIG. 10 is another view of other details of a vehicle light according to the present invention.
Figure 11:
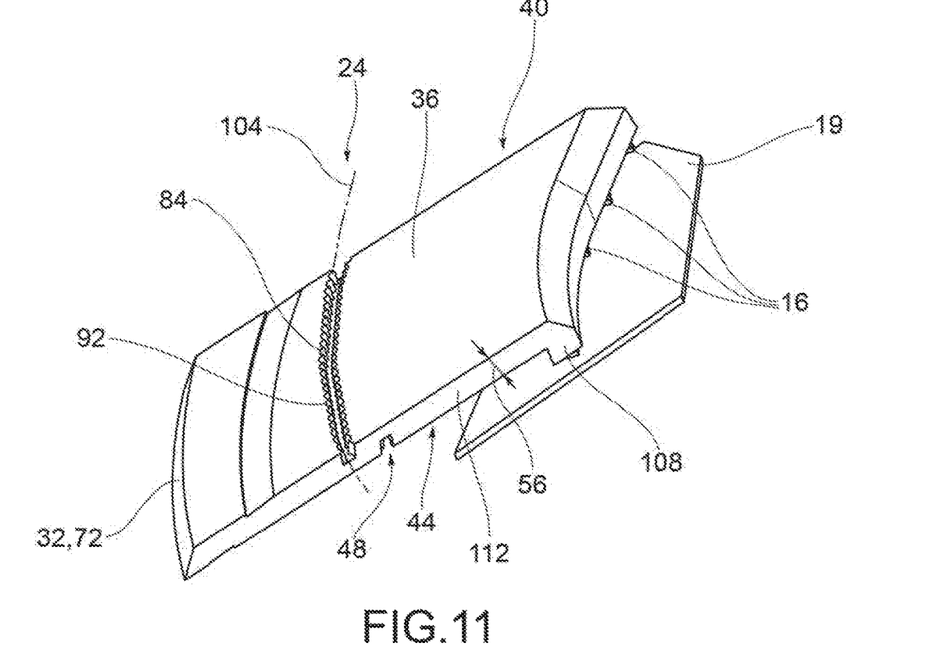
FIG. 11 is another view of other details of a vehicle light according to the present invention.

For example, the second holes 92 are substantially tangential to one another or at most interpenetrating each other for a circular sector of 1-10% of their overall area, measured with respect to a section plane perpendicular to a second hole axis Y-Y (see enlarged detail IX in FIG. 9, relating to two first adjacent holes 92',92").

For the purposes of the operation of the present invention, it is important that there is no free path from said second holes 92 for the light rays Ri. In other words, all the rays must pass through said second holes 92 to be optically influenced by the same. It should be noted that the tangency or the interpenetration of the holes may depend on the production process: laser drilling results in substantially tangential holes, whereas an injection molding process tends to assume an interpenetration of the same holes.

Preferably, the second holes 92 are circular section holes, equidistant from each other and having all the same diameter.

The second holes 92 may provide a slight flaring or draft angle in order to facilitate the extraction of the body 36 of the light guide 24 from the mold.

Preferably, the second holes 92 are the same as said first holes 52.

The second groove 84, with respect to a section plane perpendicular to the second axes Y-Y of said second holes 92, extends along a second curvilinear segment 104 substantially parallel to the light outlet wall 32.

The second curvilinear section 104 may also be rectilinear.

The step 88 between the first and second grooves 48,84, defined as the distance between the respective axes X-X and Y-Y of the first holes 52 and the second holes 92, is equal to a value sufficient to guarantee the mechanical rigidity of the light guide 24, for example, equal to the diameter of the individual holes.

Preferably, the first and second holes 52,92, blind or non-through the entire thickness 56, extend from the respective opposite first and second face 60,96 of the body 36 so as to intercept collectively the entire thickness 56 of the body 36. In other words, each radius Ri of the light beam along its path from the light inlet wall 28 to the light outlet wall 32 meets either said first hole 52 or said second hole 92, given that the sum of the first and second depths 64,100 is greater than or equal to the thickness 56 of the body 36.

Preferably, the first and second blind holes 52,92 extend from the respective opposite faces 60,96 for a first and a second depth of 64,100, each at least equal to half the thickness 56 of the body 36.

According to one embodiment, the light source 16 is oriented so as to emit light along a direction orthogonal to the plane of alignment of the light guide 24. The body 36 of the light guide 24 extends therefore with a first and a second branch 108,112 arranged preferably perpendicularly to each other so as to present overall an L-shape wherein the light inlet wall 28 and the light outlet wall 32 are substantially perpendicular to each other.

Reflecting elements are arranged at an intersection portion 116 of said first and second branches 108,112 so as to reflect the light beam propagating within the first branch 108 toward the interior of the second branch 112 of the body 36. Of course, in one variant of embodiment, the body 36 may include only the second branch 112, and the light source 16 is oriented so as to emit light in the direction along the length of the second branch 112.

The optical operation of a vehicle light according to the present invention will now be described, so as to clarify how the desired optical effect may be obtained by the use of blind holes within the light guide.

Figure 12:
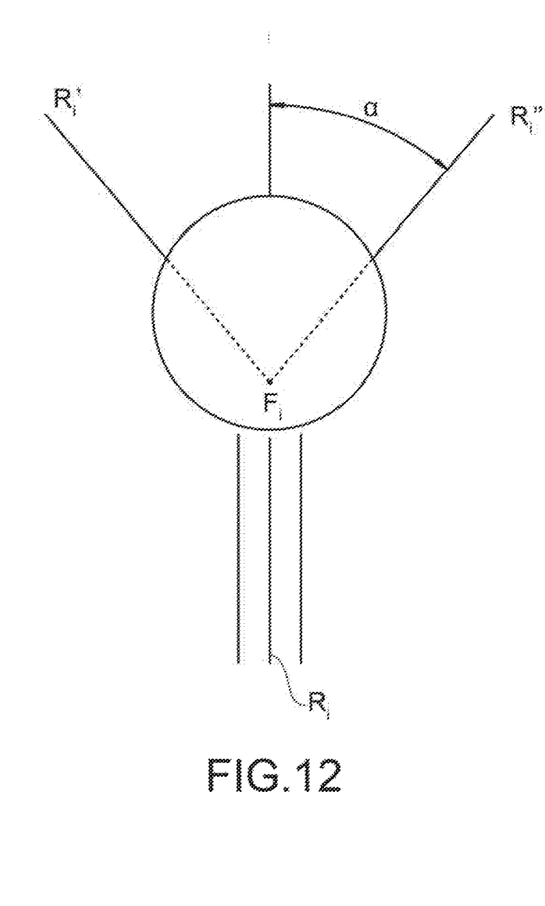
FIG. 12 is a schematic view of the optical behavior of a vehicle light according to the present invention.

In particular, FIG. 12 illustrates the behavior of a light beam having a direction parallel to a light radius Ri that strikes a hole and, by subsequent refractions and reflections, is deviated according to an angular distribution enclosed between two extreme output directions R'i, R"i.

The two refractions and reflections occur at the transition of the light beam from the material of the body to the air inside the hole and, subsequently, at the transition from the air to the material of the body. The beam is thus diffused in a light cone having an opening angle $2a$ which depends on the materials of the means crossed by the light beam. For example, in the case of the body in PMMA or PC, this angle α is equal to approximately 40 degrees. Such a light cone has an apparent origin inside a virtual focus Fi lying inside the hole.

Figure 13:
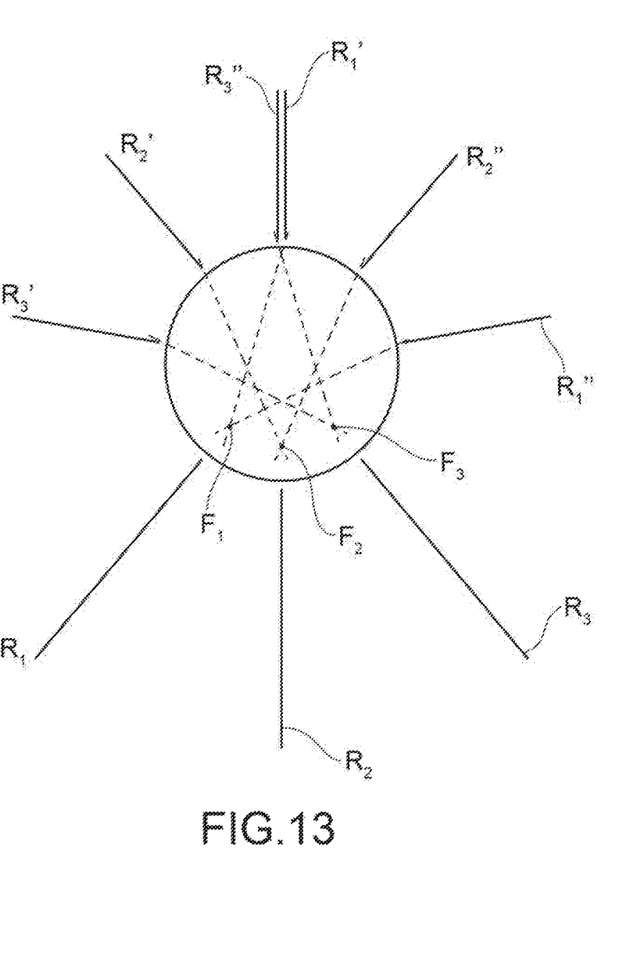
FIG. 13 is a schematic view of the optical behavior of a vehicle light according to the present invention.

FIG. 13 illustrates the same optical diffusion scheme for three distinct light beams each having a direction parallel to a light ray R1, R2, R3 coming from different directions within the light guide 24 and striking the same hole.

Each of said beams is diffused into a light cone having an opening angle 2a which is dependent on the materials of the means crossed by the light beam. In particular, each light beam having a direction parallel to a light ray R1, R2, R3 strikes a hole and, for subsequent refractions and reflections, is deviated according to an angular distribution enclosed between two extreme output directions R'1, R"1, R'2, R"2, R'3, R"3, respectively.

In addition, each light ray R1, R2, R3 identifies a light cone of 2α brightness inside a respective virtual focus F1, F2, F3 lying inside the hole.

The overlapping of such light cones R'i, R"i coming from different directions makes it possible to obtain a distribution of light at the outlet of the hole, substantially Lambertian, almost identical to the volume scattering typically produced by an opaline material.

As may be appreciated from the foregoing, the present invention overcomes the disadvantages of the prior art.

In particular, the light according to the present invention allows any opalescent-effect light pattern to be obtained without the use of any layer of opaline material on the outer lenticular body of the light or on the light guide.

In particular, the geometry of the holes develops spherical or cylindrical caustics that exploit the phenomenon of light refraction crossing different means, i.e., the plastic material of the light guide and the air. In this way, the incident light beam is splayed with an angle dependent on the materials crossed and is distributed randomly so as to spread and scatter the light, obtaining, as seen, the cited opalescent effect.

More specifically, the opalescent effect is obtainable by micro-optics or embossing applied to the light outlet wall being an aesthetic effect associated with the diffusion of the ambient light. The interaction of the holes with such micro-optics or embossing results in a homogeneous effect illuminating the light guide with LED sources, i.e. in the state of activation of the vehicle light.

Obviously, the light of the present invention is capable of absolving all the photometric specifications of the light and is able to emit a light beam that is homogeneous and pleasing to the eye of an observer.

A person skilled in the art, in the object of satisfying contingent and specific requirements, may make numerous modifications and variations to the vehicle light described above, all of which are within the scope of the invention as defined by the following claims.

The invention claimed is:

1. A vehicle light capable of emitting a light beam with opalescent effect, said vehicle light comprising:
   a container body that delimits a containment seat that houses at least one light source suitable to emit, when electrically powered, a plurality of light rays defining a light beam to propagate outside of the vehicle light,
   a lenticular body, that partially closes the containment seat and is suitable to be crossed by said light beam produced by the light source,
   a light guide facing, in correspondence of a light inlet wall, to said at least one light source, so as to receive the light beam from said light inlet wall and transmit the light beam to a light outlet wall, facing the lenticular body,
   wherein the light guide comprises a body having a prevailing longitudinal extension that defines a propagation direction of the light beam inside the body by total internal reflection, a first and a second side wall substantially parallel to said prevailing longitudinal extension,
   wherein the body has a first groove, which extends from the first to the second side wall, the first groove comprising a plurality of first cylindrical or spherical holes, defining cylindrical or spherical optics suitable to realize cylindrical or spherical caustics that produce, through successive refractions, a scattering said light rays towards the light outlet wall,
wherein said first holes are adjacent to each other without interruption, and
   wherein said first holes of the first groove are blind with respect to a thickness of the body of the light guide, penetrating from a first face of the body for a first depth less than said thickness.

2. The vehicle light as set forth in claim 1, wherein said first holes have a diameter between 1 mm and 5 mm.

3. The vehicle light as set forth in claim 1, said first holes are substantially tangential or interpenetrating each other for a circular sector equal to 1-10% of the total area of said first holes, measured with respect to a section plane perpendicular to a first axis of said first holes.

4. The vehicle light as set forth in claim 1, wherein said first holes are holes of circular section, equidistant from each other and all having the same diameter.

5. The vehicle light as set forth in claim 1, wherein the first groove, with respect to a section plane perpendicular to the first axes of said first holes, extends along a first curvilinear segment substantially parallel to the light outlet wall.

6. The vehicle light as set forth in claim 1, wherein the body, on the light outlet wall has a diffusive portion, comprising micro-optics or embossing or a satin finish, suitable to standardize and spread the light beam exiting from the light outlet wall.

7. The vehicle light as set forth in claim 6, wherein said diffusive portion extends in correspondence of a segment of the light outlet wall corresponding to the extension of said first depth of the first groove.

8. The vehicle light as set forth in claim 1, wherein the body, on the light outlet wall has a mask, arranged in correspondence of the body portion not affected by said first holes, said mask being shaped so as not to be traversed by the light rays incident on it.

9. The vehicle light as set forth in claim 1, wherein the body has a second groove, which extends from the first to the second side wall, in an offset position with respect to the first groove along the direction of propagation of the light beam by a step, the second groove comprising a plurality of second holes defining cylindrical or spherical optics suitable to realize cylindrical or spherical caustics suitable to produce, through successive refractions, a scattering said light rays towards the light outlet wall,
   wherein said second holes are adjacent to each other without interruption, and
   wherein said second holes of the second groove are blind with respect to a thickness of the body of the light guide, penetrating from a second face of the body opposite to the first face along the thickness of the body for a second depth less than said thickness.

10. The vehicle light as set forth in claim 9, wherein said second holes have a diameter between 1 mm and 5 mm.

11. The vehicle light as set forth in claim 9, wherein said second holes are substantially tangential or interpenetrating each other for a circular sector equal to 1-10% of the total area of said second holes, measured with respect to a section plane perpendicular to a second axis of said second holes.

12. The vehicle light as set forth in claim 9, wherein said second holes are holes of circular section, equidistant from each other and all having the same diameter.

13. The vehicle light as set forth in claim 9, wherein said second holes are equal to said first holes.

14. The vehicle light as set forth in claim 9, wherein the second groove, with respect to a section plane perpendicular to second axes of said second holes, extends along a second curvilinear segment substantially parallel to the light outlet wall.

15. The vehicle light as set forth in claim 9, wherein said step between the first and the second groove is equal to the diameter of said first or second holes.

16. The vehicle light as set forth in claim 9, wherein the first and second blind holes extend from the respective opposite first and second face of the body so as to totally intercept the entire thickness of the body, and thus each ray of the light beam coming from the light inlet wall, the sum of the first and second depth being greater than, or equal to, the thickness of the body.

17. The vehicle light as set forth in claim 9, wherein the first and second blind holes extend from the respective opposite faces for a first and a second depth each at least equal to half of said thickness of the body.

18. The vehicle light as set forth in claim 1, wherein the light guide, on the side of the light inlet wall, comprises reflector elements suitable to direct the light rays of the light beam incident on said reflector elements towards said light outlet wall.

19. The vehicle light as set forth in claim 1, wherein the body of the light guide comprises a first and a second branch arranged perpendicularly to each other so as to present an overall L-shape wherein the light inlet wall and the light outlet wall are substantially perpendicular to each other.

20. The vehicle light as set forth in claim 19, wherein said reflector elements are arranged in correspondence of an intersection portion of said first and second branch.

* * * * *